(12) United States Patent
Mauch et al.

(10) Patent No.: US 10,734,860 B2
(45) Date of Patent: *Aug. 4, 2020

(54) ELECTRIC MOTOR, IN PARTICULAR RADIATOR FAN MOTOR

(71) Applicant: BROSE FAHRZEUGTEILE GMBH & CO. KOMMANDITGESELLSCHAFT, WUERZBURG, Wuerzburg (DE)

(72) Inventors: Frank Mauch, Nusplingen (DE); Tobias Ott, Balingen (DE); Thomas Schencke, Langewiesen (DE); Artur Schmidt, Wuerzburg (DE); Hermann Schulz, Kleinlangheim (DE); Jan Gwozdz, Wuerzburg (DE); Thomas Ziegler, Schwebenried (DE); Thomas Hussy, Wittighausen (DE)

(73) Assignee: BROSE Fahrzeugteile GmbH & Co. Kommanditschaft, Wuerzburg, Wuerzburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/921,721

(22) Filed: Mar. 15, 2018

(65) Prior Publication Data

US 2018/0205283 A1 Jul. 19, 2018

Related U.S. Application Data

(60) Division of application No. 14/206,187, filed on Mar. 12, 2014, which is a continuation of application No. PCT/EP2012/003578, filed on Aug. 24, 2012.

(30) Foreign Application Priority Data

Sep. 12, 2011 (DE) .................. 10 2011 112 817

(51) Int. Cl.
*H02K 5/10* (2006.01)
*H02K 11/33* (2016.01)
(Continued)

(52) U.S. Cl.
CPC ............ *H02K 5/10* (2013.01); *F04D 13/0686* (2013.01); *F04D 29/646* (2013.01); *H02K 3/522* (2013.01);
(Continued)

(58) Field of Classification Search
CPC ............ H02K 5/22; H02K 5/225; H02K 3/32; H02K 3/325; H02K 5/04; H02K 5/08;
(Continued)

(56) References Cited

U.S. PATENT DOCUMENTS

| 4,110,676 A | 8/1978 | Edick ............... H02K 23/66 310/112 |
| 5,117,144 A * | 5/1992 | Torok ............... H02K 1/246 310/181 |

(Continued)

FOREIGN PATENT DOCUMENTS

| CH | 676627 A5 | 2/1991 |
| CN | 101791974 A | 8/2010 |

(Continued)

OTHER PUBLICATIONS

Hartmann (CH 676627 A5) English Translation.
Genz (DE 4217142 A1) English Translation.

*Primary Examiner* — Quyen P Leung
*Assistant Examiner* — Robert E Mates
(74) *Attorney, Agent, or Firm* — Laurence A. Greenberg; Werner H. Stemer; Ralph E. Locher

(57) ABSTRACT

An electric motor, in particular a radiator fan motor of a motor vehicle, has a rotor which is mounted such that it can rotate in relation to a stator, a motor mount which has an (Continued)

electronics compartment for accommodating a converter electronics system, and an electronics compartment cover. The electronics compartment cover has a peripheral sealing groove into which a peripheral edge of the electronics compartment engages by way of a corresponding sealing web in order to reliably seal off the electronics compartment.

6 Claims, 12 Drawing Sheets

(51) Int. Cl.
  *H02K 3/52* (2006.01)
  *H02K 5/22* (2006.01)
  *H02K 7/14* (2006.01)
  *F04D 13/06* (2006.01)
  *F04D 29/64* (2006.01)
  *H02K 5/02* (2006.01)
  *H02K 5/00* (2006.01)

(52) U.S. Cl.
  CPC .............. *H02K 5/00* (2013.01); *H02K 5/02* (2013.01); *H02K 5/225* (2013.01); *H02K 7/14* (2013.01); *H02K 11/33* (2016.01)

(58) Field of Classification Search
  CPC . H02K 5/10; H02K 5/132; H02K 5/02; F04D 13/0686; F04D 29/646
  USPC ................................. 310/43, 89, 91
  See application file for complete search history.

(56) References Cited

U.S. PATENT DOCUMENTS

| | | | |
|---|---|---|---|
| 5,331,238 A | 7/1994 | Johnsen | H02K 1/185 310/216.049 |
| 5,852,335 A | 12/1998 | Suzuki et al. | |
| 6,753,629 B2 | 6/2004 | Doi | H02K 5/161 310/156.05 |
| 6,762,521 B2 | 7/2004 | Peter et al. | |
| 8,212,439 B2 | 7/2012 | Dautel et al. | |
| 8,415,846 B2 | 4/2013 | Best et al. | |
| 8,721,306 B2 | 5/2014 | Andersen et al. | |
| 2002/0109426 A1 | 8/2002 | Peter et al. | |
| 2002/0117914 A1 | 8/2002 | Doi et al. | |
| 2006/0006094 A1 | 1/2006 | Hofmann | H02K 5/10 206/706 |
| 2007/0114862 A1 | 5/2007 | Cha et al. | |
| 2007/0210669 A1 | 9/2007 | Fukasaku | H02K 1/185 310/216.023 |
| 2008/0304986 A1 | 12/2008 | Kenyon | A61M 16/0066 417/423.12 |
| 2009/0224626 A1 | 9/2009 | Eppler | H02K 1/146 310/215 |
| 2009/0324435 A1* | 12/2009 | Sears | H02K 3/522 417/423.7 |
| 2010/0090547 A1 | 4/2010 | Yano | H02K 5/24 310/43 |
| 2010/0141065 A1 | 6/2010 | El Baraka | H02K 3/38 310/71 |
| 2010/0187920 A1 | 7/2010 | Best et al. | |
| 2010/0264762 A1* | 10/2010 | Dautel | F01P 5/02 310/64 |
| 2014/0325829 A1 | 11/2014 | De Filippis | |

FOREIGN PATENT DOCUMENTS

| | | |
|---|---|---|
| CN | 101815874 A | 8/2010 |
| DE | 4217142 A1 | 11/1993 |
| DE | 19947438 A1 | 6/2001 |
| DE | 102007010865 A1 | 9/2008 |
| DE | 102008000124 A1 | 7/2009 |
| DE | 102009013363 A1 | 9/2010 |
| EP | 0610767 A2 | 8/1994 |
| EP | 1217715 A1 | 6/2002 |
| EP | 1947347 A1 | 7/2008 |
| EP | 2214293 A1 | 8/2010 |
| JP | H08298737 A | 11/1996 |
| JP | 2002262517 A | 9/2002 |
| JP | 2010161863 A | 7/2010 |
| KR | 1020070054370 A | 5/2007 |
| WO | 2010136966 A2 | 12/2010 |

* cited by examiner

ELECTRIC MOTOR, IN PARTICULAR RADIATOR FAN MOTOR

CROSS-REFERENCE TO RELATED APPLICATION

This application is a divisional of patent application Ser. No. 14/206,187, filed Mar. 12, 2014; which was a continuation, under 35 U.S.C. § 120, of International application No. PCT/EP2012/003578, filed Aug. 24, 2012; the application also claims the priority, under 35 U.S.C. § 119, of German patent application No. DE 10 2011 112 817.8, filed Sep. 12, 2011; the prior applications are herewith incorporated by reference in their entirety.

BACKGROUND OF THE INVENTION

Field of the Invention

The invention relates to an electric motor, in particular a brushless electric motor with an inner rotor, preferably a radiator fan motor of a motor vehicle.

An electric motor of this type usually contains a rotor which is mounted rotatably with respect to a stationary stator. In the case of a brushless electric motor, the stator is often fitted with a rotating-field winding, by which a magnetic rotating field is produced by applying an alternating current to the winding. The rotor arranged within the substantially hollow-cylindrical stator is generally fitted with permanent magnets which generate a rotor magnetic field alternating with the rotating field of the stator.

In the case of a brushless electric motor, the alternating current provided in order to feed the stator winding is usually generated by a convertor (invertor). In the case of smaller electric motors, the convertor is often accommodated together with an associated control electronics unit in an electronics compartment, which is integrated into the motor housing. Here, the control electronics unit is to be protected against moisture, which is why, in the case of such electric motors used for example as radiator fan motors in motor vehicles, comparatively high demands are placed on the tightness of the electronics compartment.

SUMMARY OF THE INVENTION

The object of the invention is therefore to specify an electric motor of the aforementioned type, of which the electronics unit is reliably sealed with minimal outlay.

Accordingly, the electric motor, which is preferably brushless and configured as an inner rotor, contains a rotor which is mounted rotatably with respect to a stator, and contains a motor mount. The motor mount forms or contains an electronics compartment for accommodating a convertor electronics system. In addition to the passive and active components, in particular such as a plurality of power semiconductors which are connected in the form of a bridge circuit, the converter electronics system contains a printed circuit board which is fitted, inter alia with the components.

An electronics compartment cover also referred to hereinafter as a housing cover covers the electronics compartment in a sealing manner. For this purpose, the electronics compartment cover has a peripheral sealing groove and the motor mount, in the region of the electronics compartment, has a sealing edge running around the electronics compartment. The sealing edge is provided with a sealing web which engages, in particular in a form-fitting manner, in the sealing groove of the electronics compartment cover.

The sealing web protrudes upwardly in a lobe-like manner from the peripheral sealing edge and is integrally molded thereon, forming sealing shoulders on either side. The dimensions of the mount-side sealing edge on the one hand and of the cover-side sealing groove on the other hand are selected in such a way that a filling gap for receiving a sealing material remains between the sealing web and the sealing groove. The sealing material is preferably a sealing compound that becomes adhesive by heating.

When fitting the electronics compartment cover or housing cover, in order to center the cover as precisely as possible and therefore ensure a filling gap that is as uniform as possible for the sealing compound, spacing pawls or nubs are molded into the peripheral sealing groove on the cover side. Only a few spacing pawls or nubs provided at exposed locations are required for a corresponding sufficient centering and uniform gap formation. These pawls or nubs are preferably integrally molded on the inner side of the sealing groove, which is to say on the groove wall facing the electronics compartment. The filling gap region that is formed between the opposed outer-side groove wall of the cover-side sealing groove and the sealing web thus remains free of interruptions. It is thus ensured that at least this filling gap region in the joined state between the housing cover and the electronics compartment is filled with an interruption-free and sufficiently voluminous length of the sealing material. A reliable seal between the housing cover and the electronics compartment is thus produced in a simple manner.

In order to provide a further or alternative measure for centering, at least for roughly centering, and fixing, at least roughly fixing, the housing cover on the motor mount, fixing clamps are integrally molded on the housing cover, preferably on opposite sides. These fixing clamps pass over the ribs, which are provided on the motor mount and extend suitably radially, in order to preferably lock together with the ribs.

In a suitable embodiment the stator is over-molded by a plastic casing. A particularly reliable and easily produced connection between the motor mount and the stator is expediently achieved in that a number of caulking nubs are integrally formed on the plastic casing of the stator and pass through fixing openings provided on the motor mount. To join the motor mount and the stator or the plastic casing thereof, the caulking nubs passing through the fixing openings are, for example, hot-caulked and thus deformed. Four caulking points of this type are suitably provided between the substantially circular stator or the plastic casing thereof and the suitably relatively flat motor mount produced as a cast part.

The sealing concept according to the invention of the electric motor additionally or alternatively contains sealing elements that enable the winding ends or connection ends of the stator-side rotating-field winding formed from coils to be passed through into the electronics compartment in a sealed manner. For this purpose, sealing elements are provided that are preferably produced from a two-component plastic and that contain a comparatively hard supporting component and a comparatively soft seal component as a one-piece component part.

In the assembled state, the sealing elements sit with the comparatively soft seal component thereof in openings that are formed in the motor mount in the region of the base of the electronics compartment. These soft seal components of the sealing elements are formed suitably in the manner of a labyrinth seal.

The comparatively hard supporting components of the sealing elements protrude on the mount side of the motor mount facing away from the housing cover and facing toward the stator. Here, the position of the sealing elements is selected in such a way that the comparatively hard supporting components thereof are located axially above the stator-side plastic casing. In order to position the sealing elements in a manner aligned with the stator-side plastic casing, receiving pockets are formed in the plastic casing, in which the comparatively hard supporting components sit.

For a reliable positioning, fixing and/or stabilization, plug pins, preferably two plug pins, are integrally formed on each of the supporting components and can be inserted into corresponding plug openings in the plastic casing in the region of the receiving pockets, that is to say in the pocket bases thereof. Two openings in each of the hard supporting components of the sealing elements serve to pass through two winding ends which exit from the soft seal components of the sealing elements and are contacted in the assembled state within the electronics compartment with the convertor electronics system arranged there, preferably producing a delta connection of the coil windings or rotating-field windings.

For a particularly reliable sealing of the winding ends at the exit points thereof from the soft seal components, sealing sleeves are integrally formed thereon and enclose the respective winding end in a sealing manner.

The sealing concept for the winding ends of the rotating-field winding or coils thereof by the sealing elements constitutes an invention in itself. The electric motor in this regard, in particular as a radiator fan motor for a motor vehicle, contains a rotor which is mounted rotatably with respect to a stator, and contains a motor mount containing an electronics compartment for a convertor electronics system and having openings within the electronics compartment. The winding ends of a stator-side rotating-field winding are introduced into the electronics compartment via sealing elements. The sealing elements, which preferably consist of a two-component plastic, each have a comparatively soft seal component and a comparatively hard supporting component, wherein the seal element sits in a sealing manner via the soft seal component thereof, which is suitably formed as a labyrinth seal, in the respective opening in the motor mount or electronics compartment.

In an advantageous embodiment of this electric motor the stator is over-molded by a plastic casing, in which receiving pockets are molded, in which the hard supporting component of the respective sealing element sits. The further embodiments of the seal elements also apply similarly to this electric motor according to the invention.

The joint between the motor mount and the stator over-molded by the plastic casing, the joint being provided by the caulking nubs integrally molded on the plastic casing, also constitutes an independent invention. The electric motor in this regard, in particular as a radiator fan motor for a motor vehicle, contains a rotor which is mounted rotatably with respect to a stator, and containing motor mount, wherein the stator is over-molded by a plastic casing. At least one caulking nub, preferably a plurality of caulking nubs, are integrally molded on the plastic casing and pass through the corresponding caulking or fixing openings in the motor mount and can be deformed, preferably can be hot-formed, in order to join the motor mount and the stator.

Other features which are considered as characteristic for the invention are set forth in the appended claims.

Although the invention is illustrated and described herein as embodied in an electric motor, in particular a radiator fan motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings (examples).

DETAILED DESCRIPTION OF THE INVENTION

Figure 1:
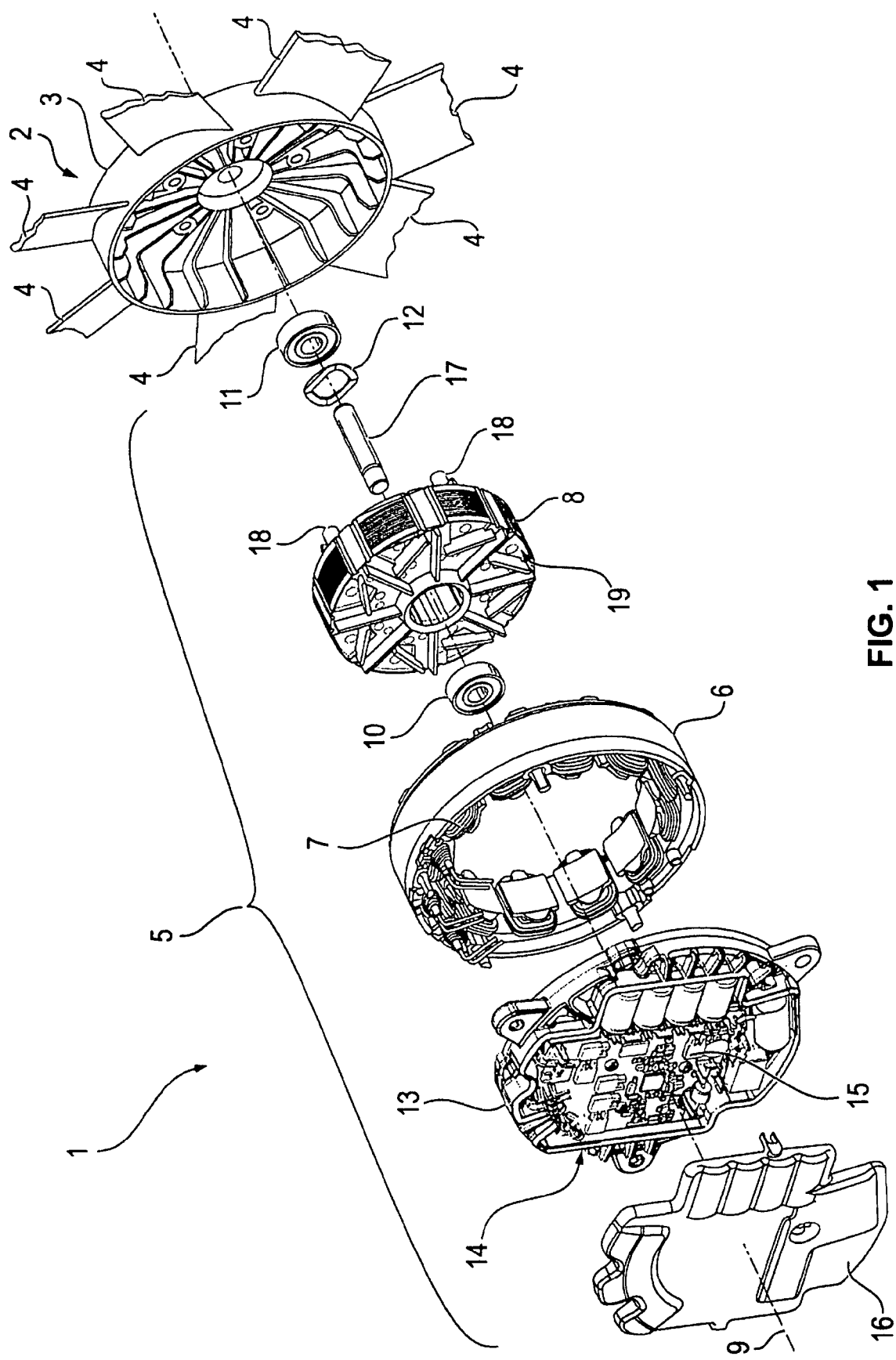
FIG. 1 is a diagrammatic, exploded, perspective view of a radiator fan for a motor vehicle with its own cooled, brushless inner rotor motor with integrated convertor electronics system according to the invention.

Parts and dimensions corresponding to one another are always provided in all figures with like reference signs. Referring now to the figures of the drawings in detail and first, particularly to FIG. 1 thereof, there is shown an exploded view of a fan 1 for a radiator of a motor vehicle. The fan 1 contains an impeller 2 with a central cap 3, around the outer circumference of which (only illustrated in part) air guide vanes 4 are uniformly distributed. The fan 1 further contains an electric motor 5, also referred to as a fan motor, by which the impeller 2 is driven in rotation.

The motor 5 is formed substantially by a stator 6, on which a three-phase rotating-field winding 7 is wound in the form of coils. The motor 5 further contains a permanently excited rotor 8, which is mounted rotatably about a motor axis 9 within the stator 6. In order to mount the rotor 8, the motor 5 contains two rolling bearings 10 and 11, which act on the rotor 8 from axially opposed sides. The axial play of the rotor 8 between the two rolling bearings 10 and 11 is spring-loaded here by a spring washer 12.

The motor 5 further contains an approximately disk-shaped motor mount 13. An electronics compartment 14 is introduced into the motor mount 13 at an end face facing away from the impeller 2, a convertor electronics system 15 being inserted into the electronics compartment. In order to tightly close the electronics compartment 14, the motor 5 contains an electronics compartment cover 16, also referred to hereinafter as a housing cover.

The rotor 8 is formed (in a manner not illustrated in greater detail) by a laminated core, into which permanent magnets for generating an exciting field are inserted, wherein the laminated core is over-molded together with the inserted permanent magnets by a plastic casing. Similarly, the stator 6 also contains a laminated core that is over-molded by a plastic casing.

The motor mount 13 is formed in particular by a one-piece die-cast part made of aluminum. The electronics compartment cover 16 is preferably an injection-molded part made of plastic.

On its front face, the rotor 8 is provided with four screw bosses 18, by which the rotor 8 is screwed to the impeller 2 in the assembled state. The motor 5 and therefore the entire fan 1 is fastened to the vehicle via the motor mount 13, which for this purpose is provided with three screw tabs 19 protruding from its outer circumference. The motor 5 is a brushless inherently cooled inner rotor motor.

Figure 2:
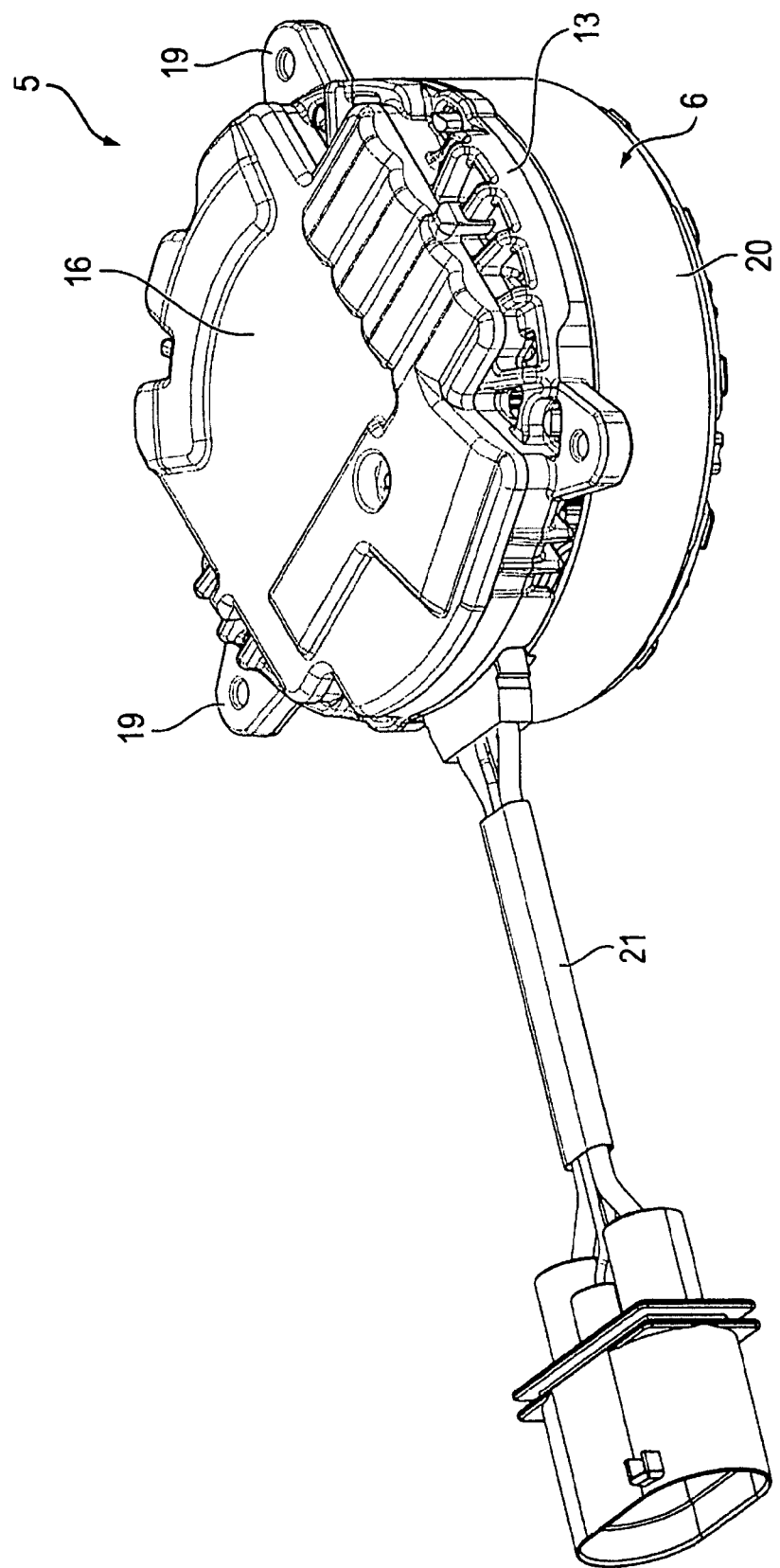
FIG. 2 is a perspective view from a connection side of the motor according to FIG. 1.

In the assembled state of the motor 5 shown in FIG. 2 the stator 6 is fixedly attached on a front face of the motor mount 13. The rotor 8 is inserted into the stator 6 over-molded by the plastic casing 20, wherein the rotor 8 is flanked on both axial sides by one of the two rolling bearings 10 and 11. The rolling bearings 10 and 11 are mounted here in a manner not illustrated in greater detail on an axial pin which is in turn fastened to the motor mount 13.

Figure 3:
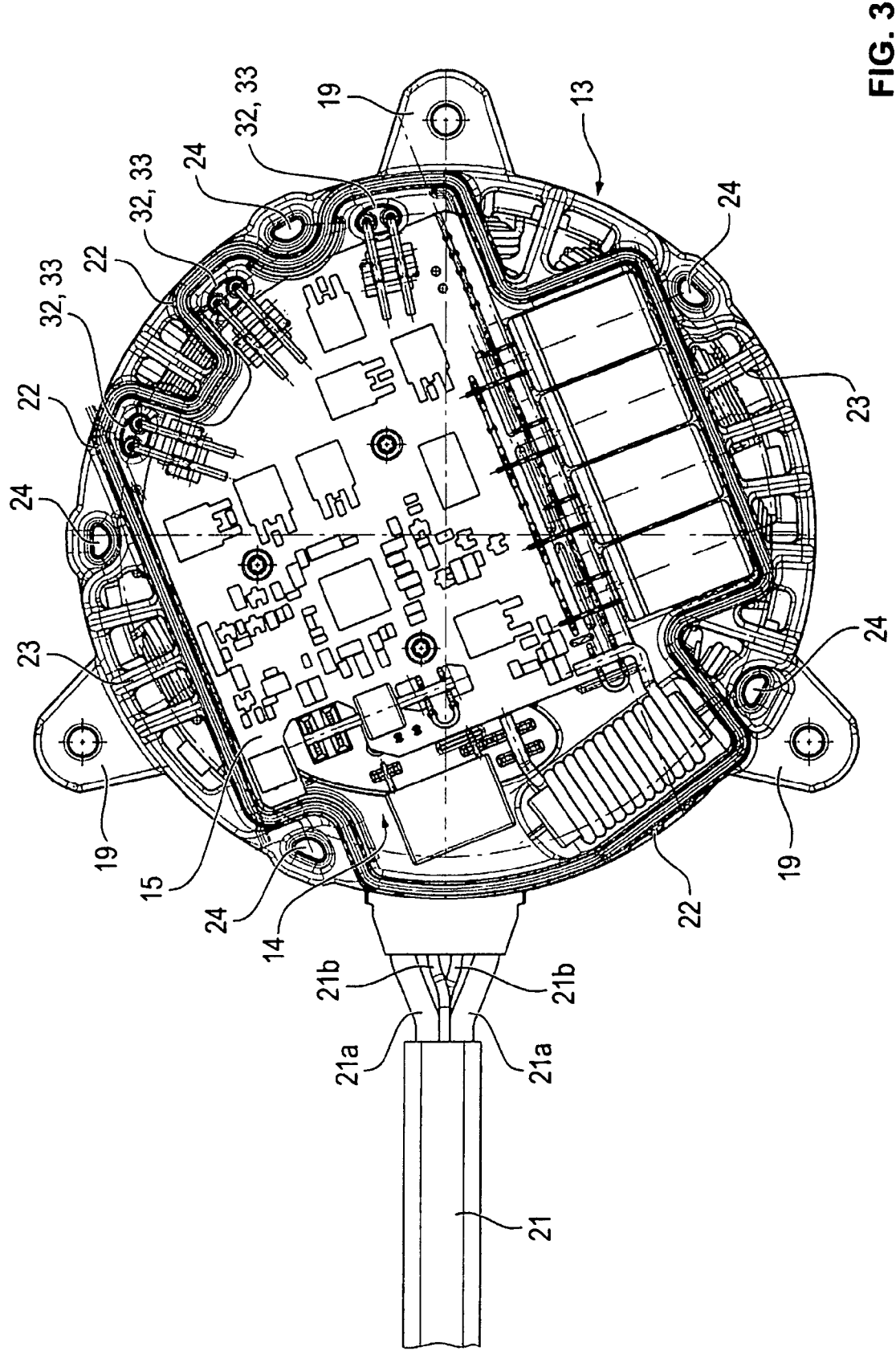
FIG. 3 is a plan view of the motor according to FIG. 1 with removed electronics compartment cover (housing cover)

FIG. 3 shows the motor 5 with a removed electronics compartment cover 16, looking into the electronics compartment 14 with convertor electronics system 15 arranged therein. Supply lines (positive and negative pole or ground pole) 21a and sensor or data lines 21b of a connection cable 21 are led to or contacted with the convertor electronics system. The electronics compartment 14 is enclosed by a peripheral, closed sealing or joining edge 22. Outside the electronics compartment 14, the motor mount 13 has clamping ribs 23 running substantially radially. These ribs are located substantially on opposite sides of the electronics compartment 14. Fixing or caulking openings 24 are located at a number of positions distributed over the circumference of the motor mount 13.

Figure 4:
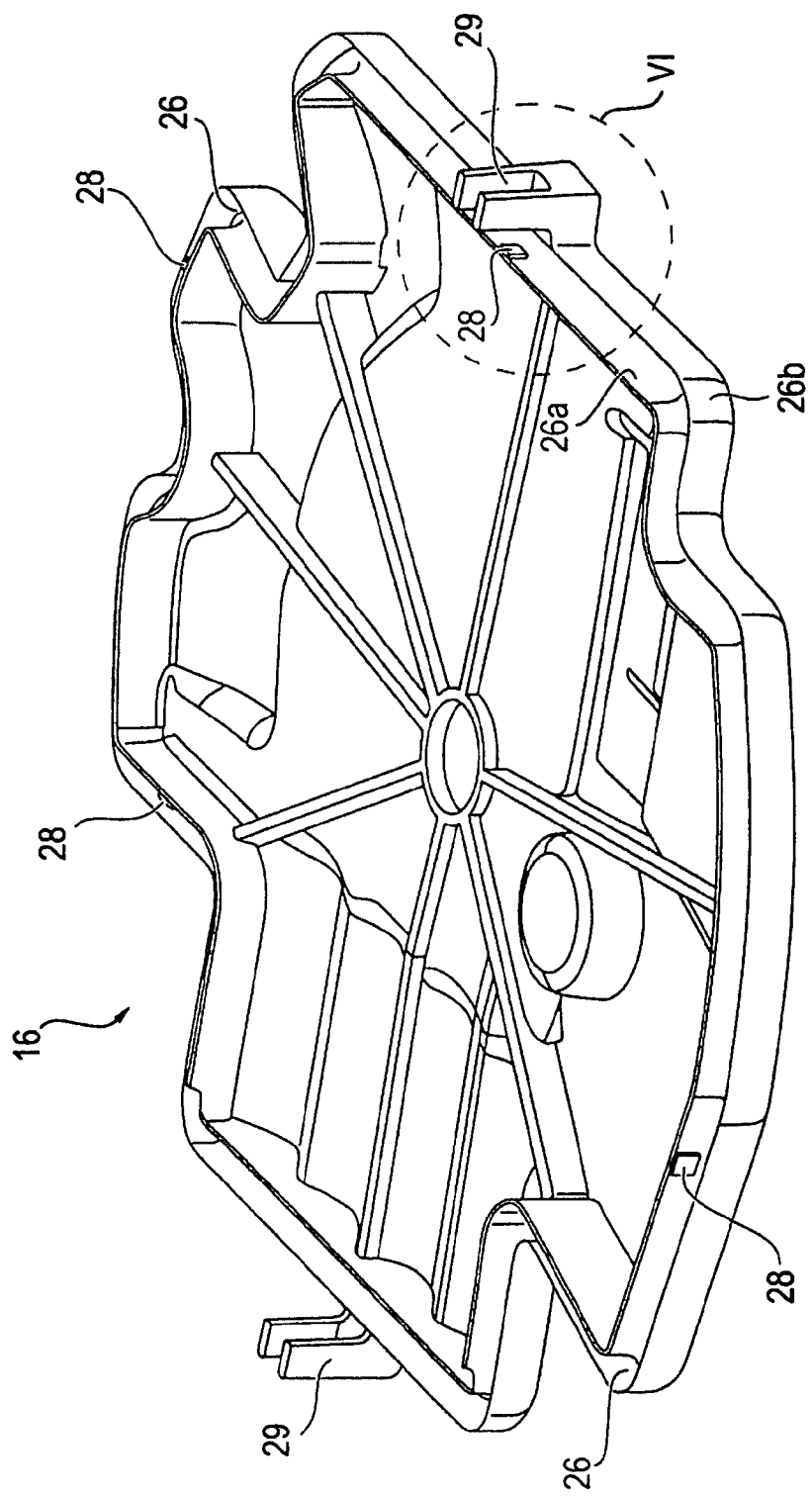
FIG. 4 is a perspective view of the electronics compartment cover from an inner side thereof.
Figure 5:
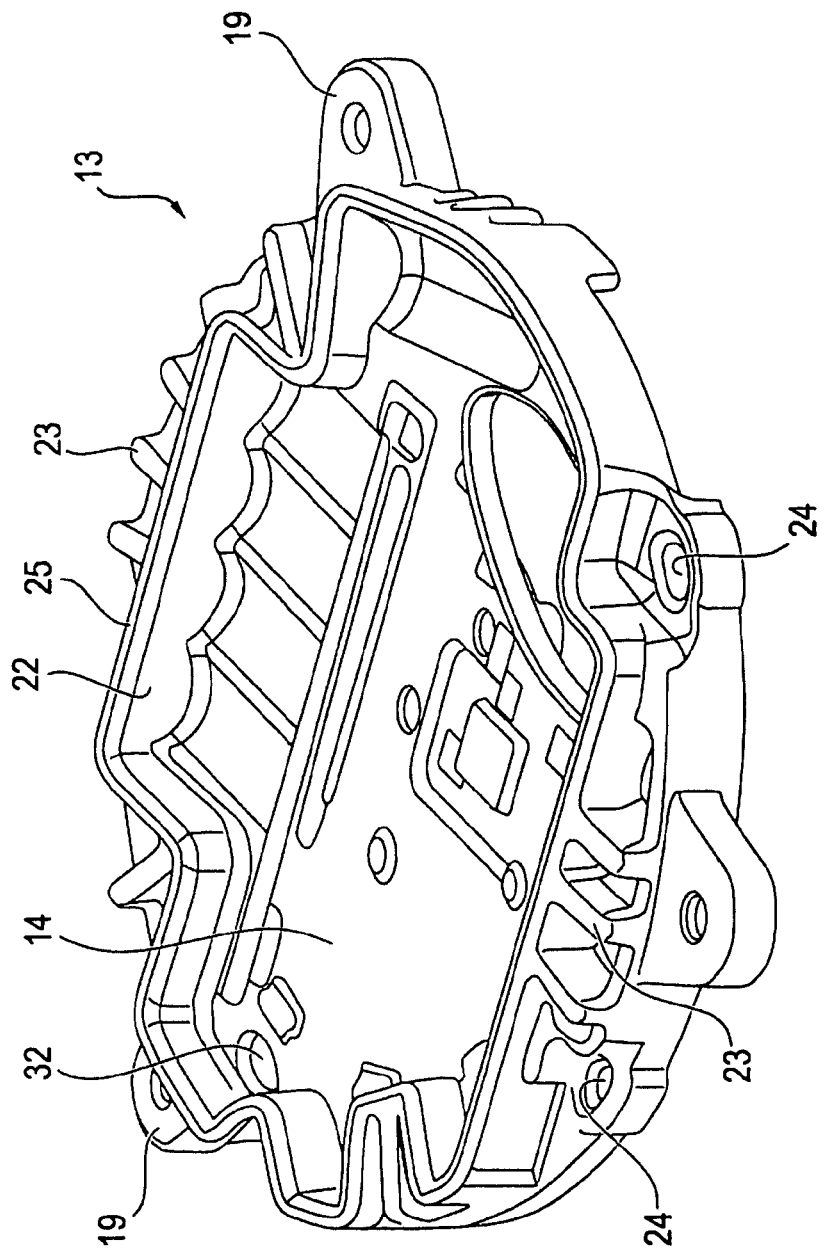
FIG. 5 is a perspective view of a motor mount of the electric motor, looking into the electronics compartment without convertor electronics system.

Whereas FIG. 4 shows the electronics compartment cover or housing cover 16 with a view of the inner side thereof, FIG. 5 shows a perspective illustration of the motor mount 13 with the electronics compartment 14 thereof enclosed by the sealing edge 22, without convertor electronics system 15. A raised sealing web 25 is integrally molded on the sealing edge 22 of the electronics compartment 14 and is likewise closed peripherally, the contour of the sealing web as well as that of the electronics compartment edge 22 and the shoulder-like contour thereof at the transition to the sealing web 25 being visible comparatively clearly in FIG. 7.

Figure 7:
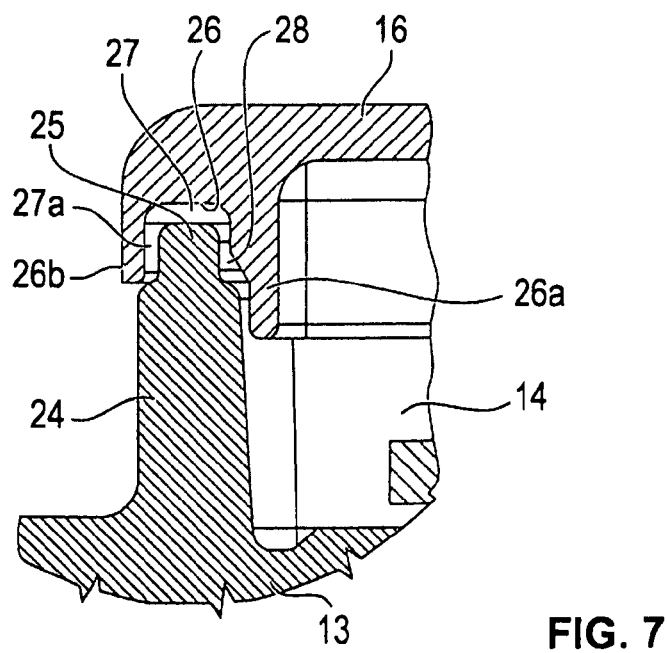
FIG. 7 is a sectional view of a centering joint between the housing cover and the edge of the electronics compartment of the motor mount.

In the joined state of the electronics compartment cover 16 and the motor mount 13, the mount-side sealing web 25 engages with a corresponding sealing groove 26 in the housing cover 15 (FIG. 7). The dimensions of the mount-side sealing web 25 and of the cover-side sealing groove 26 are matched to one another in such a way that a filling gap 27 for a sealing material (not shown) remains therebetween.

A number of spacing pawls 28 are integrally formed on the inner side of the sealing groove 26, specifically on the groove wall 26a thereof facing the electronics compartment 14, and protrude into the sealing groove 26. In the joined state, the mount-side sealing web 25 bears against the spacing pawl 28 at the accordingly exposed locations. These spacing pawls 28 result in a reliable centering when the housing cover 16 is fitted onto the edge 24 of the electronics compartment 14, in such a way that a correspondingly uniform filling gap 27 for the sealing compound, which for example becomes adhesive by heating, remains along the peripherally closed sealing edge 24 of the electronics compartment 14 between the mount-side sealing web 25 and the cover-side sealing groove 26 in the joined state. In particular, an uninterrupted, that is to say also pawl-free, filling gap region 27a is produced on the groove side opposite the spacing pawl 28, that is to say between the outer-side groove wall 26b and the sealing web 25. The sealing compound or adhesive compound filled into the filling gap region thus provides a peripherally practically constant sealing or adhesive volume for a particularly reliable seal of the electronics compartment 14 and fixed adhesive join between the housing cover 16 and the motor mount 13.

Figure 8:
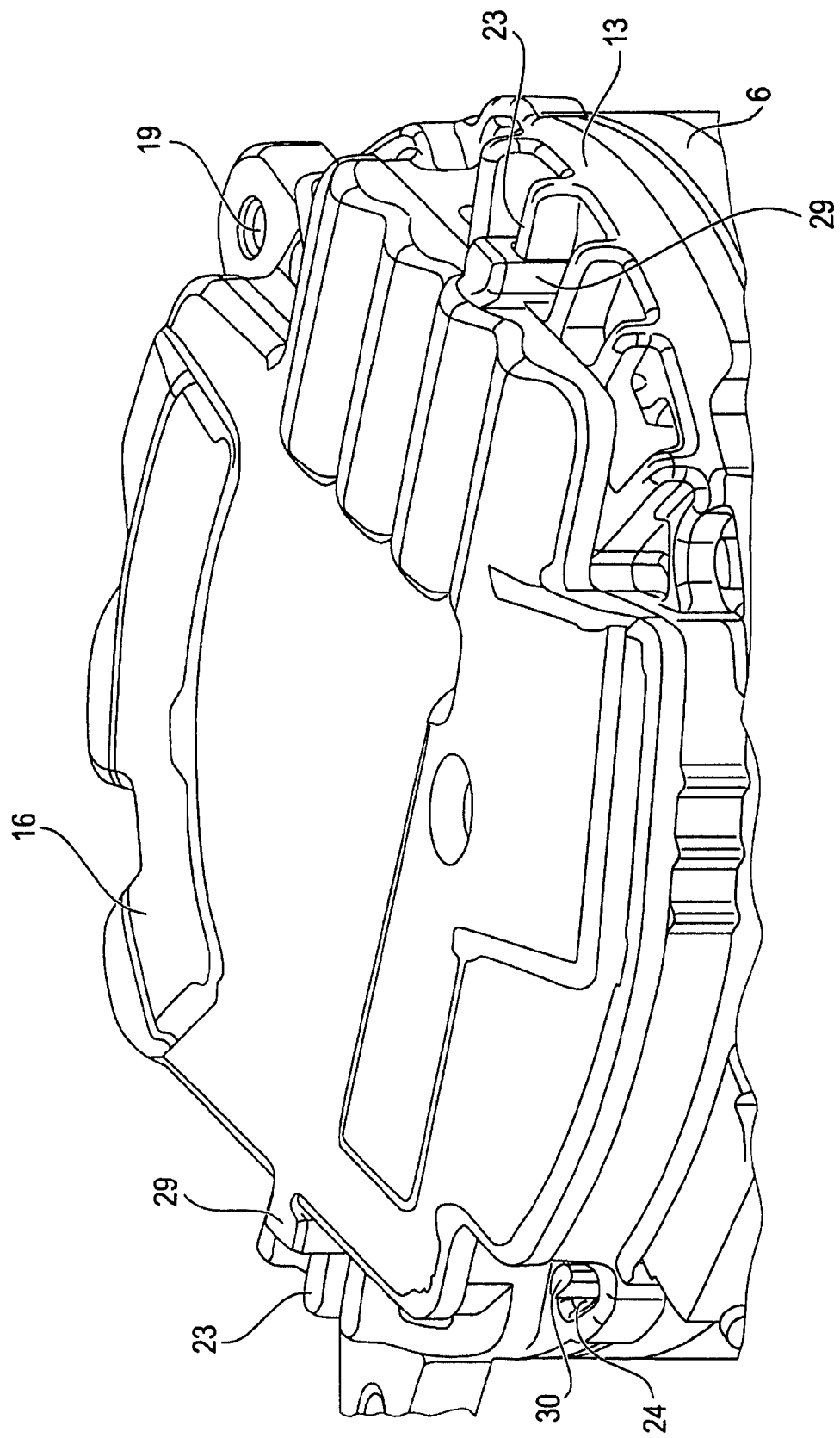
FIG. 8 is a perspective view according to FIG. 2 of a detent connection between the cover-side fixing clamp and a mount-side rib.

At least one fixing or latching clip 29 is integrally formed on the electronics compartment cover 16 for roughly fixing and/or roughly positioning. As can be seen from FIG. 4, two fixing clamps 29 that are diametrically opposed where possible are provided. As can be seen from FIG. 2 and comparatively clearly from FIG. 8, the fixing clamps 29 are locked with corresponding clamping ribs 23 of the motor mount 13.

Figure 6:
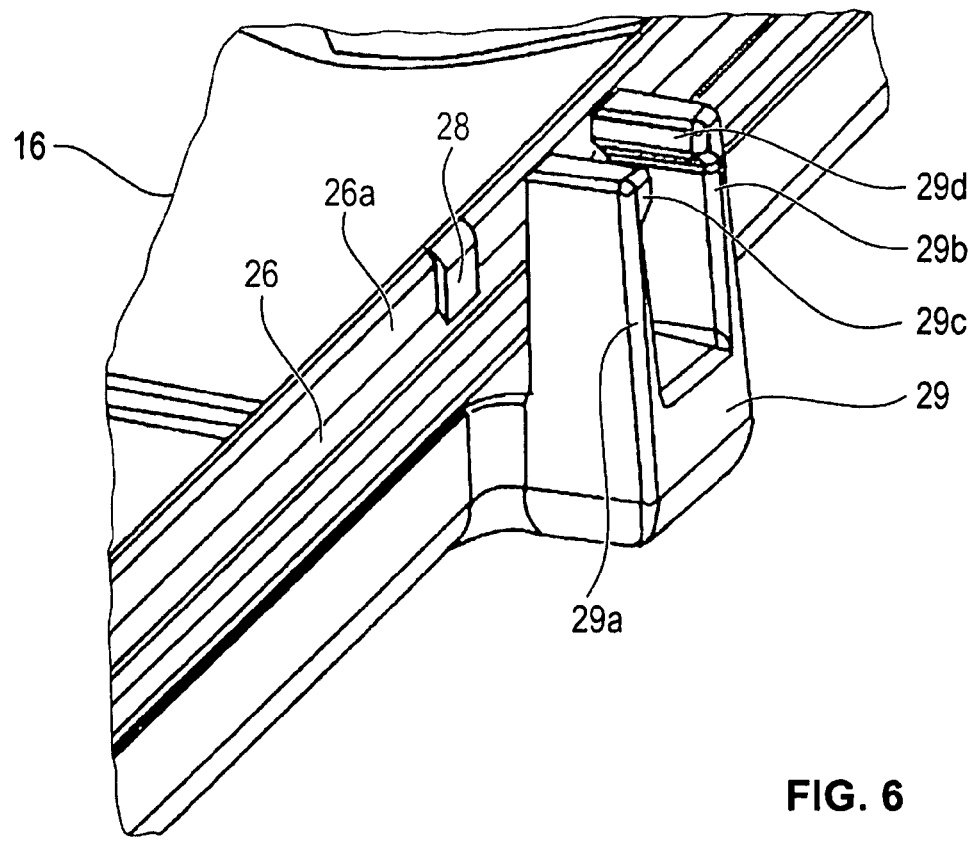
FIG. 6 is a perspective view of detail VI shown in FIG. 4 on an enlarged scale with a fixing clamp integrally molded on a housing cover and with a spacing pawl in a cover sealing groove.

For this purpose, the respective fixing clamp 29 is formed in accordance with FIG. 6 in a substantially U-shaped manner with two clamping branches 29a and 29b, which each carry, at the end, a detent pawl 29c and 29d respectively. The detent pawls 29c, 29d are directed inwardly and preferably extend toward one another at the same height. In the locked state, the two detent pawls 29c and 29d engage around the corresponding clamping rib 23 of the motor mount 13.

Figure 9:
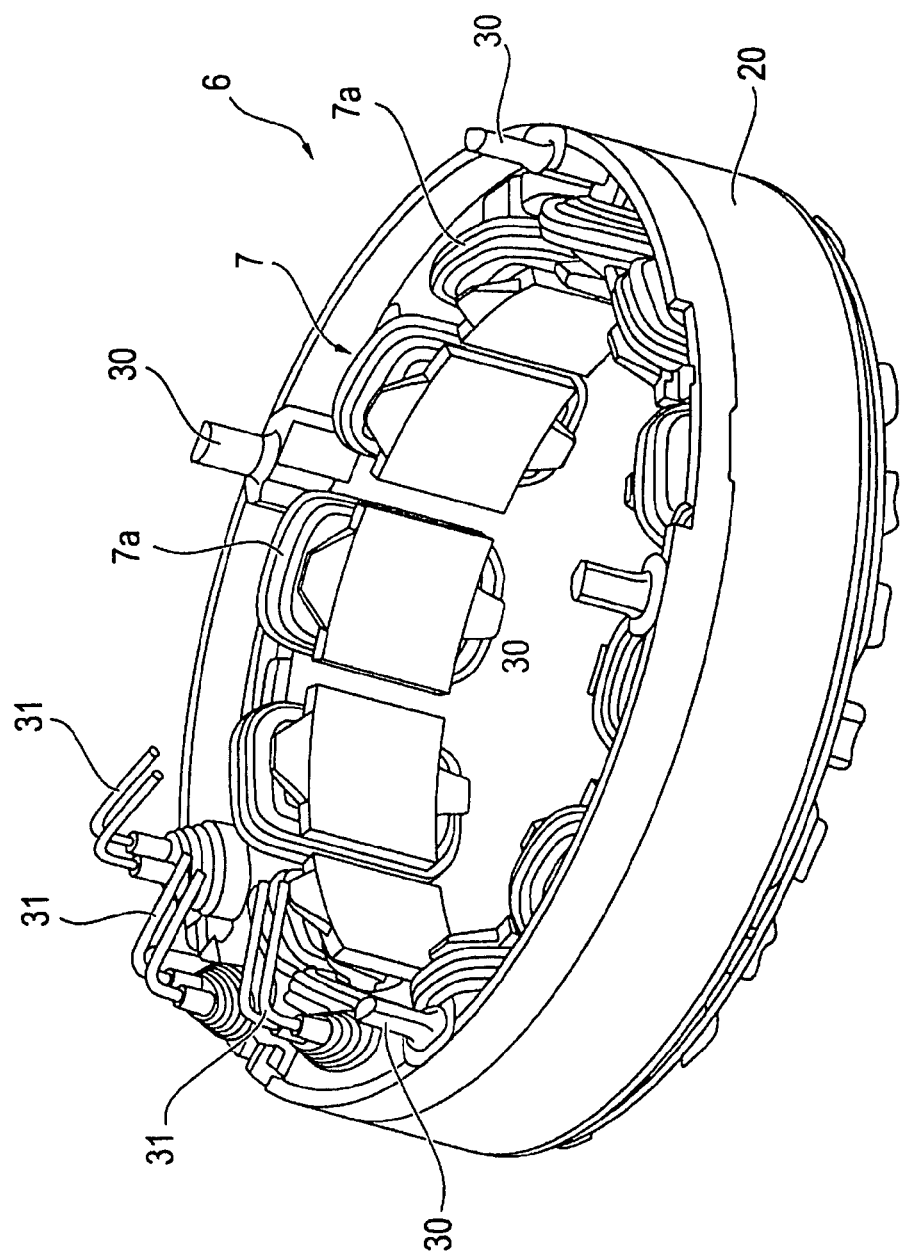
FIG. 9 is a perspective view of the stator of the motor, the stator being wound by coils of a rotating-field winding, with an over-molded plastic casing with caulking nubs and with winding ends guided via sealing elements, according to FIG. 8 the effect of the rotor being that of inherent cooling of the motor in the event of rotor rotation against the reference rotation direction.
Figure 10:
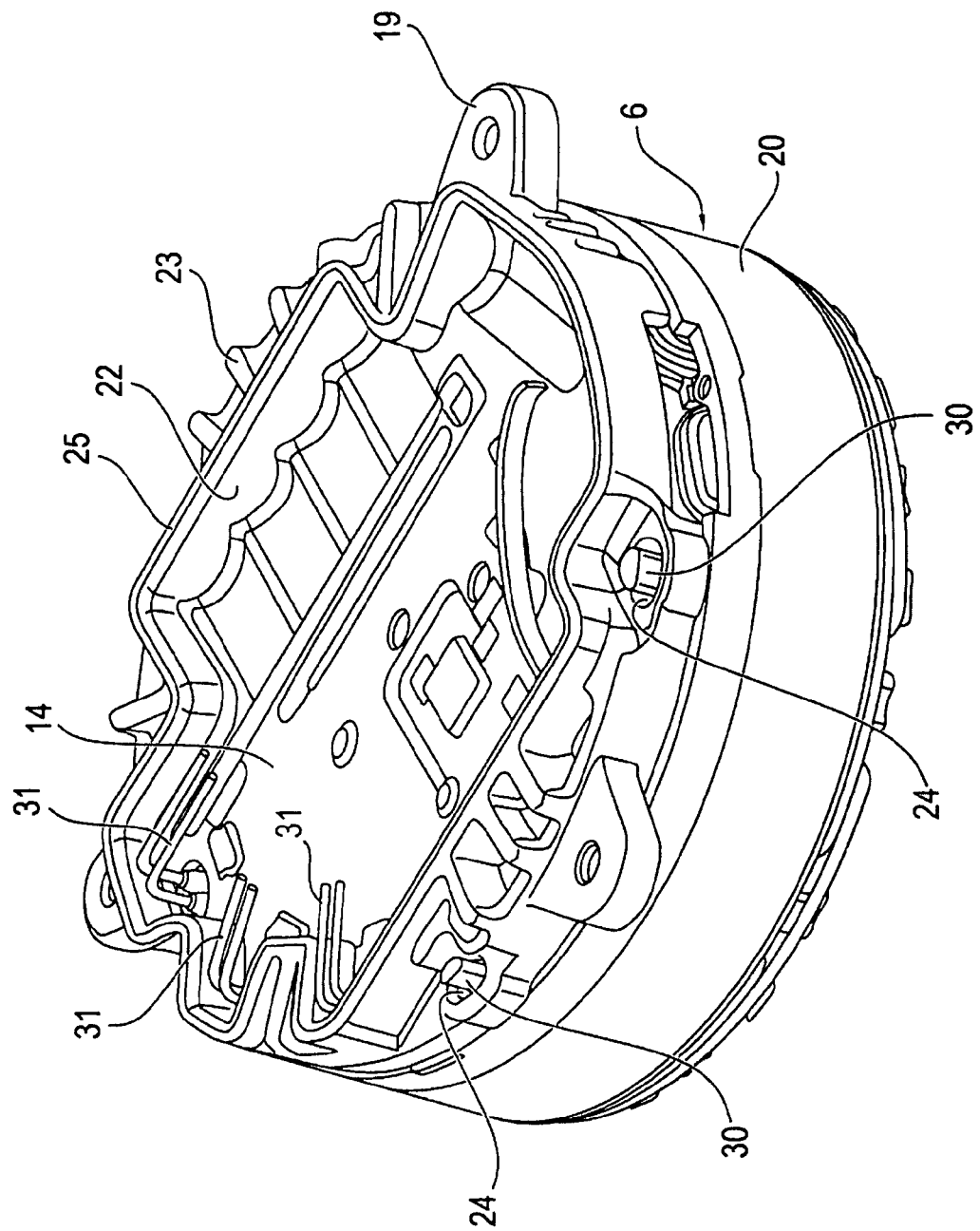
FIG. 10 is a perspective view according to FIG. 5, of the motor mount joined to the over-molded stator, as viewed from a caulking point.

FIG. 9 shows the stator 6, on which the rotating-field winding 7 is wound and which is over-molded by the plastic casing 20. In order to connect the stator 6 to the motor mount 13, caulking nubs 30 raised in the direction of the motor mount 13 are integrally formed on the plastic casing 20 of the stator 6 and pass in the joined state through the corresponding caulking or fixing openings 24 in the motor mount 13. The joined state is illustrated in FIG. 10. The caulking nubs 30 are then caulked, for example hot-formed.

In the joined state, the pairs 31 of winding ends 31a, 31b of the rotating-field winding 7 preferably protrude in each case in the same quadrant of the circular stator 6 into the electronics compartment 14, where they are bent substantially at right angles in a manner running radially inwardly. Three such pairs 31 of winding ends 31a, 31b are provided. When joined so as to contact the convertor electronics system 15, the winding ends 31a, 31b are preferably connected in a delta connection of the coils 7a forming the rotating-field winding 7.

The winding end pairs 31 of the rotating-field winding 7 are introduced into the electronics compartment 14 via openings 32 in the motor mount 13 in a manner reliably sealed by sealing elements 33. Each of the sealing elements 33 consists of a two-component plastic with a comparatively soft sealing component 33a and with a comparatively hard supporting component 33b formed in one piece with the comparatively soft sealing component.

Figure 11:
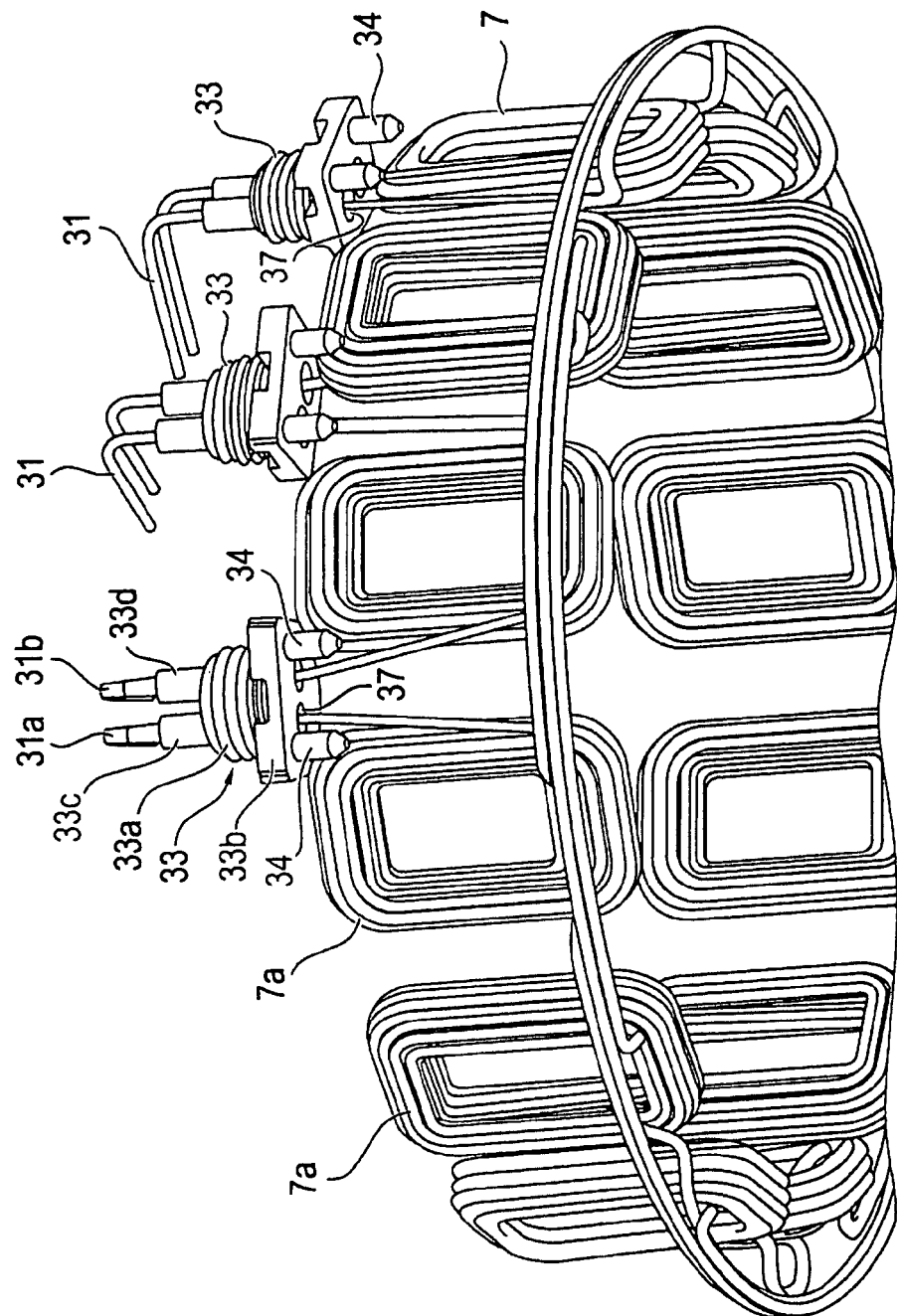
FIG. 11 is a perspective view of the rotating-field winding with winding ends thereof guided through sealing elements.

As can be seen comparatively clearly from FIG. 11, the comparatively soft seal component 33a of the respective sealing element 33 is formed in the manner of a labyrinth seal with outer-side beads arranged axially in succession. The comparatively hard supporting component 33b formed in one piece with the soft seal component 33a carries integrally molded plug pins 34 on the base side, that is to say on the underside facing away from the soft seal component 33a. Here, two such plug pins 34 are provided per seal element 33.

Figure 12:
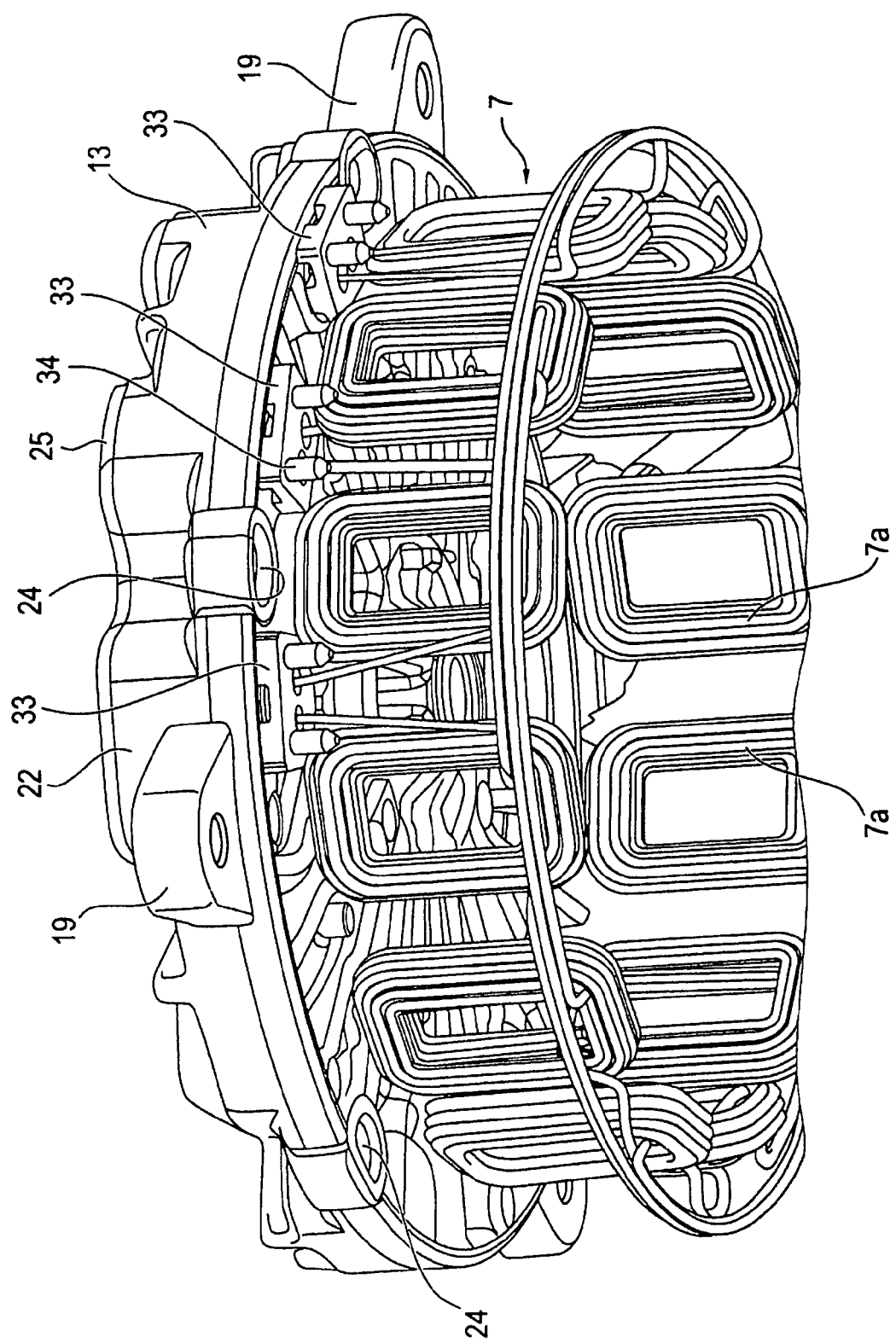
FIG. 12 is a perspective view of the winding and a sealing element arrangement according to FIG. 11 with a fitted motor mount.

As can be seen from FIG. 12, the hard supporting component 33b of the respective sealing element 33 protrudes from the motor mount 13 on the mount side facing the stator 6 or the rotating-field winding 7. In the meantime, the soft seal component 33a of the corresponding sealing element 33 sits in a sealing manner in the mount-side opening 32 in the motor mount 13.

Figure 13:
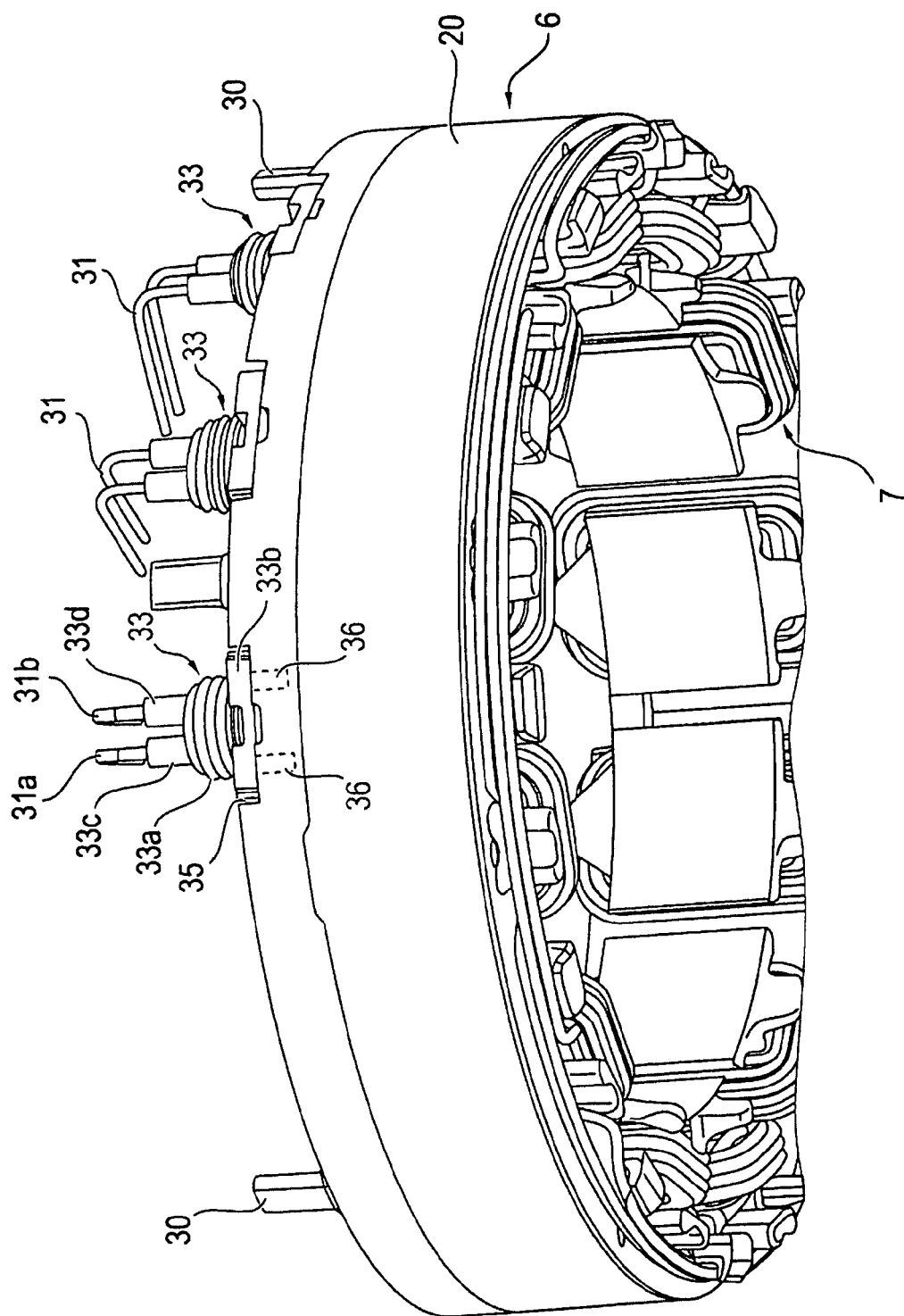
FIG. 13 is a perspective view of the arrangement according to FIG. 11 inclusive of stator laminated core.

As can be seen from FIG. 13, the comparatively hard supporting component 33b of the respective sealing element 33 sits in the assembled state in a receiving pocket 35 molded into the plastic casing 20 of the stator 6. Base-side plug openings 36 are formed in the receiving pockets 35, the corresponding plug pins 34 of the sealing elements 33 plugging into the plug openings.

As can be seen comparatively clearly from FIGS. 11 and 13, a sealing sleeve 33c or 33d is molded integrally on the soft seal component 33a of the respective sealing element 33 for each of the winding ends 31a and 31b respectively of the winding end pair 31 and encases the respective winding end 31a or 31b respectively in a sealing manner. In addition, openings 37 for passing the winding ends 31a, 31b through the respective seal element 33 are formed in the hard supporting component 33b of the seal element.

The invention is not limited to the above-described exemplary embodiments. Rather, other variants of the invention can also be derived by a person skilled in the art without departing from the subject of the invention. In particular, all individual features described in conjunction with the various exemplary embodiments can be combined differently without departing from the subject of the invention.

The sealing concept for the winding ends 31, 31a, 31b of the rotating-field winding 7 or coils 7a thereof by the sealing elements 33 is thus already inventive per se and therefore constitutes its own invention.

The electric motor 5 in this regard, in particular formed as a radiator fan motor for a motor vehicle, contains a rotor 8 which is mounted rotatably with respect to a stator 6, and contains a motor mount 13 having an electronics compartment 14 for a convertor electronics system 15 and having openings 32 within the electronics compartment 14. The winding ends 31, 31a, 31b of a stator-side rotating-field winding 7 are introduced via sealing elements 33 into the electronics compartment 14. The seal elements 13, preferably consisting of a two-component plastic, each have a comparatively soft seal component 33a and a comparatively hard supporting component 33b, and wherein the respective seal element 33 sits in a sealing manner via the soft seal component 33a thereof, which is suitably formed as a labyrinth seal, in the respective opening 32 in the motor mount 13 or electronics compartment 14.

In an advantageous embodiment of this electric motor 5 the stator 6 is over-molded by a plastic casing 20, in which receiving pockets 35 are molded, in which the hard supporting component 33b of the respective sealing element 33 sits. The further embodiments of the sealing elements 33 also apply similarly to the electric motor 5 according to the invention.

The joint between the motor mount 13 and the stator 6 over-molded by the plastic casing 20, the joint being provided by the caulking nubs 30 integrally molded on the plastic casing 20, also constitutes an independent invention.

The electric motor 5 in this regard, in particular formed as a radiator fan motor for a motor vehicle, contains a rotor 8 which is mounted rotatably with respect to a stator 6, and contains a motor mount 13. The stator 6 is over-molded by a plastic casing 20, on which at least one caulking nub, preferably a plurality of caulking nubs 30, are integrally molded and pass through the corresponding caulking or fixing openings 24 in the motor mount 13 and can be deformed, preferably can be hot-formed, in order to join the motor mount 13 and the stator 6.

The invention claimed is:

1. An electric motor, comprising:
   a stator with a stator-side rotating field winding having winding ends, said stator being overmolded with a plastic casing;
   a rotor rotatably mounted with respect to said stator;
   a motor mount formed with an electronics compartment for accommodating a converter electronics system and openings within said electronics compartment;
   sealing elements with a comparatively hard supporting component and a comparatively soft sealing component;
   said winding ends of said stator-side rotating field winding being inserted into said electronics compartment via said sealing elements;
   said sealing elements with said comparatively soft sealing component sitting in the respective said opening;
   said comparatively hard supporting component of said sealing elements protruding on a carrier side, facing said stator, of said motor mount; and
   each said sealing element sitting with said comparatively hard supporting component in a receiving pocket of said plastic casing on said stator.

2. The electric motor according to claim 1 configured as a radiator fan motor of a motor vehicle.

3. The electric motor according to claim 1, wherein said sealing elements consist of a two-component plastic.

4. The electric motor according to claim 1, wherein the comparatively soft sealing component of the respective said sealing element is formed as a labyrinth seal.

5. The electric motor according to claim 1, which comprises a plurality of caulking nubs integrally formed on said plastic casing of said stator, the caulking nubs passing through corresponding fixing openings formed in said motor mount and being configured for deformation in order to join said motor mount and said stator.

6. The electric motor according to claim 1, wherein said comparatively hard supporting component of the respective said sealing element has at least one plug pin, which engages in a corresponding plug opening formed in said plastic casing of said stator.

* * * * *